Dec. 14, 1937. G. H. FRASER 2,101,844
SPEED REDUCER AND OTHER TRANSMISSION
Filed Aug. 9, 1935
Fig. 1.
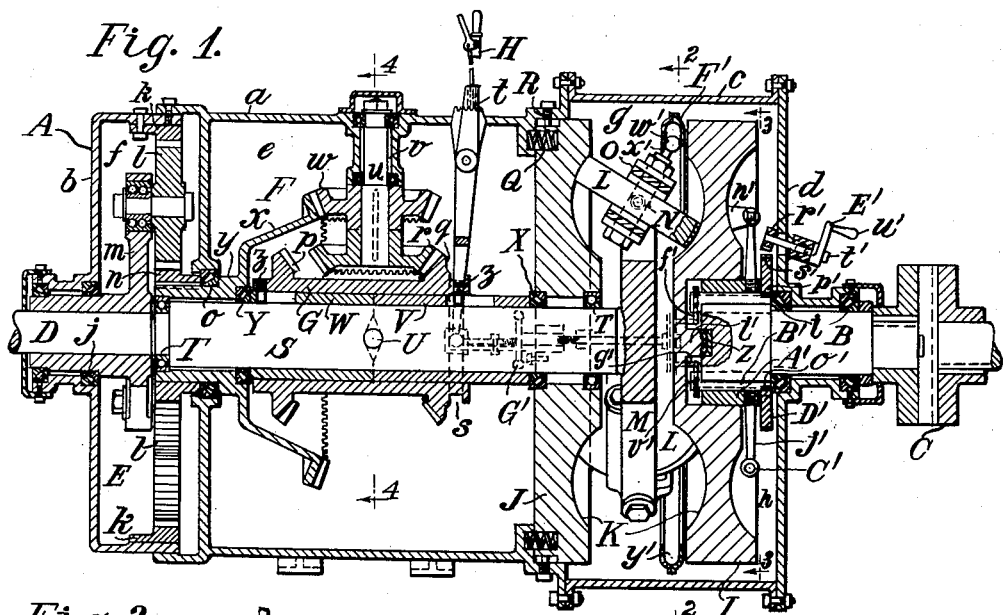
Fig. 2.
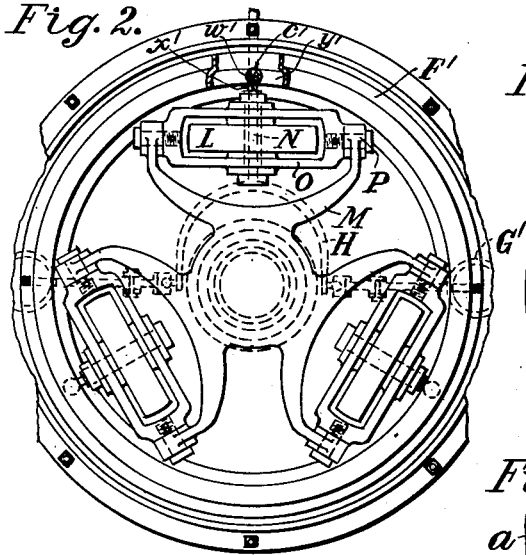
Fig. 3.
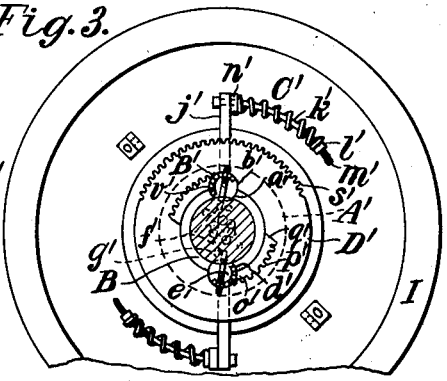
Fig. 4.
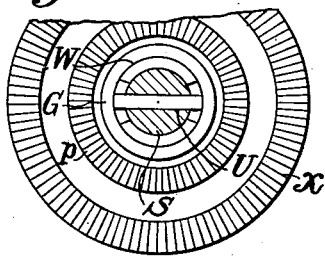
Fig. 5.
INVENTOR
George Holt Fraser Patented Dec. 14, 1937

2,101,844

UNITED STATES PATENT OFFICE 2,101,844

SPEED REDUCER AND OTHER TRANS-
MISSION

George Holt Fraser, Brooklyn, N. Y.

Application August 9, 1935, Serial No. 35,500

20 Claims. (Cl. 74—281)

This is a continuation in part of my application Serial No. 631,853, filed Sept. 6, 1932 of which the following is a specification.

This invention relates to speed change means, variable speed means, rotation reversal means, ratio variation means, and speed reducers and other devices for varying and transmitting rotary motion, and aims to provide certain improvements therein.

It relates especially to such devices, using gearing for positively reducing high speed of a motor or primary driver to the low speed required for a driven shaft, and to such devices using ratio variation means for varying the speed ratio between the drive and the driven shaft, and to such devices tractionally transmitting rotary motion between the drive shaft and the reduction gearing, and to such devices using torque responsive means for varying the traction with variations in torque, and aims to provide such devices with cooperable torque responsive torque and rotation termination means, for drive disconnection when torque becomes excessive.

Heretofore, gear reducers have been connected to a drive shaft positively for positive reduction, or by a compensating coupling to provide for imperfect alignment or flexure of the shafts, or by a cushioning coupling for cushioning shock.

Heretofore, variable speed frictional transmissions have comprised revoluble, rotatable and oscillatory planetary rollers, revoluble around the axis of concave annular tracks, rotatable around an axis radially of such axis, and oscillatory on an axis at right angles to such radial axis, for varying their speed of rotation, to vary the speed of rotation of a part driven by them, the tracks being normally frictionally engaged with the rollers by a spring and additionally engaged by torque responsive wedge means for varying traction with variations in torque.

Some such devices have included torque responsive continued torque and rotation transmission torque responsively yieldable ratio variation means, designed during transmission to continuously transmit a variable torque load, and to continuously transmit rotation throughout variations in said torque load and after overload, and to torque responsively vary ratio of said transmission during said variable torque load, and to continue transmission of torque and of rotation at a major torque load after overload of said torque responsive means.

My invention aims to provide torque responsive torque termination and rotation termination means for and cooperable with any such devices, designed to transmit a normal torque load minor to said major torque load, operable to transmit torque and rotation therethrough during said normal torque load, and being operable upon overload to terminate said transmission of torque therethrough, and said transmission of rotation therethrough, and being operable to protect such devices from transmission of torque and of rotation upon and after termination thereof upon overload of said minor torque load; and it further aims to provide various features of improvement in the construction, arrangement, and operation, of such devices.

To this end in carrying out the preferred form of my invention as applied to such devices of the type comprising revoluble and rotatable speed change or variable speed means, and ratio variation means therefor, preliminary to rotation reduction means such as a planetary spur gear reducer, and rotation continuation and termination means in operative relation thereto, and direction reversal means in operative relation thereto, I preferably provide such devices with torque responsive torque termination or rotation termination means designed to transmit a normal torque load, and to transmit torque and rotation therethrough during said normal torque load, and to terminate said transmission upon overload, in cooperable operative relation to and drivingly connectable and disconnectable with rotary drive or driven means and with the variable speed means, and make the latter rotatable with and circumferentially oscillatory relatively to an axially fixed drive shaft which is rotatable with and relatively to said variable speed means, preferably by being disconnectably drivingly coupled to a driver member or sleeve on which is torsionally oscillatorily mounted a rotary traction member having an annular concave traction race in the form of an arc of a circle, spaced from which is a non-rotary member having a similar concave race, such races being spaced by oscillatory planetary rolls which are rotated by revolution of the first member for transmitting their rotation, at the reduced speed of their axles to a rotary spider carrying them, for transmitting this variable and reduced speed to a driven part; and I preferably connectably and disconnectably drivingly connect this spider to the drive pinion of a train of reducing gears of a spur gear reducer for positively reducing and transmitting the variable speed of the spider to the driven shaft when drivingly connected, and for rotating freely relatively to said pinion when drivingly disconnected, for then terminating such transmission; and I supplement the usual spring tractional pressure of the non-rotary race member by a torsionally responsive traction control axially actuative against said non-rotary member for increasing the tractional pressure with increase in torque; and I provide a circumferentially torsionally yieldable connection between the sleeve and the rotary race member for compensating or cushioning minor variations in torque and for permitting the race member to oscillate on the sleeve member until torque becomes excessive, and I provide an oscillatory key connection between the drive shaft and the sleeve member and an operative connection between such key and rotary race member, for uncoupling such key when the rotary race member is oscillated by excessive torque, for then drivingly disconnecting such member from the drive shaft, and I preferably provide various other features of improvement all of which will be hereinafter more fully set forth with reference to the accompanying drawing in which—

Fig. 1 is a vertical axial section showing the preferred form of my improved speed reducer, the rotary race being drivingly coupled to the drive shaft, and the planetary rolls being in slow speed position, and the reducing gearing being in reverse drive position;

Fig. 2 is a fragmentary transverse section thereof cut approximately on the line 2—2 in Fig. 1 and looking in the direction of the arrow;

Fig. 3 is a fragmentary transverse section thereof cut approximately on the line 3—3 and looking in the direction of the arrow;

Fig. 4 is a fragmentary transverse section thereof cut approximately on the line 4—4 and looking in the direction of the arrow; and Fig. 5 is a fragmentary horizontal axial section thereof.

Referring to the drawing let A indicate the frame or outer casing of a speed reducer, B its drive shaft, C a compensating coupling for flexibly connecting the drive shaft with a motor or other primary source of power, D its driven shaft, E its train of speed reducing gearing in operative relation to the drive and driven shafts for reducing the high speed of the drive shaft to the desired low speed of the driven shaft, n a reducer drive pinion driven from the drive shaft and in drive engagement with for driving a reducing gearing, I a rotary traction wheel driven from the drive shaft, J a reciprocal non-rotary traction wheel spaced from said wheel, L an oscillatory variable speed tractional roller between and in operative relation to said wheels and between and drivingly connected with the drive shaft B and the reducer pinion n for transmitting drive from the shaft B to the pinion n and for varying the speed of such transmitted drive.

These parts may be of any usual or suitable construction for reducing and transmitting rotary motion.

The casing A is shown as consisting of separably connected annular castings comprising a central section a, closed at one end by a gear cover b and carrying a head section c, closed at the other end by a head cover d. The section a is shown as enclosing a transmission chamber e, and the cover b is shown as enclosing a gear chamber f, and the section c is shown as enclosing a variation chamber g, and the cover d is shown as enclosing a control chamber h.

The drive shaft B is shown as radially and axially positively positioned by a tapering roll or other anti-frictional bearing i in the head d, The coupling C is shown as the usual thrust slide coupling for compensating for mis-alignment between the drive shaft B and a motor or other driving shaft.

The driven shaft D is shown as radially and axially sustained by radial and thrust ball bearings j in the cover b.

The reducing gear E is shown as the simple form comprising a non-rotary annular rack k carried by the cover b and engaged by teeth of the planetary gears l carried by a rotary spider m keyed to the driven shaft and revolved at slow speed by rolling of the planetary gears l on the rack k, which gears mesh with and are rotated by the rotation of a toothed pinion n radially and axially positioned by a tapered roller or other bearing o carried by the casing A, which pinion is drivingly connected with and driven from the variable speed tractional rollers L, which are rotated at reduced and variable speed from the drive shaft B for transmitting rotation at variable speed from the latter to the reducing gearing for reducing the speed of such rotation and transmitting rotary motion at reduced speed to the driven shaft.

According to one feature of improvement my invention provides for independent rotation of the variable speed means relatively to the reducer pinion n, and provides for drive connection and drive disconnection of these, by providing drive continuation and discontinuance and direction reversal means between them, as a separable and reversible drive connection F between the variable speed rollers L and the reducer drive pinion n, for discontinuance of drive connection between them, or for reversal of direction of drive of the pinion n from the variable speed rollers.

Preferably this is disposed within the transmission chamber e and comprises an axially slidable sleeve G spliningly connected with and to be rotated from the variable speed rollers L and having reverse bevel gears p and q spaced at opposite sides of a bevel pinion r to clear this pinion when the sleeve is slid into its mid or drive discontinuance position, and to mesh with the teeth of this pinion and rotate it in one or the reverse direction when the sleeve is slid to mesh one or the other of its gears with the pinion for forward or reverse drive, a gear shift lever H fulcrumed to the casing A and engaging a groove s in the sleeve, and held by a lock t, being shown for sliding the sleeve, and locking it in position. The pinion r is keyed on a stud shaft u rotatably mounted in a bearing v in the casing A and carrying a smaller bevel pinion w meshing with a larger bevel gear x having a hub y extended through and radially and axially sustained by the bearing o and to which the pinion n is keyed, for revolving the reducing gears in forward or reverse direction or for discontinuance of their revolution according to the position of the sleeve G which is splined and rotated by one or more keys z.

According to another feature of improvement my invention provides improved means for speed variation and tractional or frictional transmission between the high speed of the drive shaft B and the positive ratio of reduction of the reducing gearing, which I accomplish within the variation chamber g by providing drivingly connectable and drivingly disconnectable variable speed means between the drive shaft B and the pinion n, and drivingly connectable and disconnectable with both the drive shaft B and the pinion n, as by disconnectably rotating with the drive shaft B a rotary friction disc I, and by slidably mounting on the casing A a non-rotary friction disc J, which discs are axially spaced and have on their adjacent sides reversely concave annular friction tracks or races K in the cross-sectional shape of a segment of a circle the centre of which is equidistant between them, which races are spaced and engaged by planetary friction rolls L, carried by, and revolving around the axis of, a spider member M, and rotatable about an axis radially thereof, and oscillatory about an axis at right angle to both said axes, for varying the angularity of the rolls relatively to the races, for varying their rolling speed, and for transmitting half of such speed to the spider M for revolving it at variable and reduced speed from the rotary race, according to a well known principle of operation, in which the axis of the spider M is coincident with that of the drive shaft B, and the rollers L are mounted on radial axes N carried by oscillatory frames O mounted on axes P perpendicular to said axes and oscillatorily mounted in the yoke M, the periphery of the rolls having the shape of a segment of a sphere the radius of which corresponds with the radius of the races, to insure full tractional engagement between the races and the rolls in any position of oscillation of the latter, pressure means, as springs Q, being usually provided for pressing the races toward the rolls with the pressure desired for normal tractional engagement of these, and a non-rotative slidable connection as the key screw R being provided for resisting rotation of the non-rotary race, concentrically of which race the shaft S of the spider is revolubly and axially movably mounted in radial thrust axially slidable bearings T so that it may be revolved by the revolution of the planetary rolls and axially adapt itself to their position especially when they are constructed of compressible or other material for permitting their compression to increase their tractional engagement with the races, by which shaft S I rotate the pinion $n$ of the reducing gearing preferably by the axially slidable reversible and disconnectable connection between these afforded by the sleeve G.

According to another feature of improvement I supplement the normal traction afforded by the pressure means Q with a torque responsive connection actuant independently of the discontinuance means F axially against the non-rotary race member J, and between this and the pinion $n$, for increasing tractional engagement of the frictional drive with increase in torque, which I accomplish in the construction shown by a wedge or pin U on the shaft S co-operating with the reverse double wedge faced sleeves V and W slidably mounted around the shaft S and oscillatorily keyed to it by the pin U for rotating the sleeves from the shaft and exerting a wedging tendency to axially separate them proportional to the torque transmitted from the key U to the sleeves V and W which latter are splined to the sleeve G by the key screws $z$, so that they rotate the sleeve G while permitting it to be shifted.

The sleeve V is axially sustained by an axial thrust tapering roller or ball bearing X between it and the non-rotary race J, and the sleeve W is axially sustained by an axial thrust tapering roller or ball bearing Y between it and the hub $y$ of the gear $x$, which sustains axial stress of the key U in its direction so that all axial stress of the key U due to torque will be transmitted through the sleeve V and its bearing X to the slidable non-rotary race J, thus increasing the tractional pressure against the rollers L coincident with increase of torque, to increase traction with increase of torque, against which tractional pressure the rotary race I is sustained by a bearing Z in the drive shaft B, which is axially sustained against such stress by its axial thrust bearing $i$.

According to another feature of my invention I provide such devices with cooperable torque responsive torque termination or rotation termination means in operative relation to them and to one of their rotary shafts, designed to transmit a normal torque load, and to transmit torque and rotation therethrough during said normal torque load, and to terminate said transmissions upon overload of said torque responsive torque or rotation transmission termination means, and I provide for relative rotation and for connectable and disconnectable drive engagement between the drive shaft B and the tractional member I, and for circumferential oscillation of the latter as to the drive shaft, and I provide for protection of the tractional members and of the motor or other primary drive from injury from excessive load of torque, and I provide for this at the intake side of the variable speed means, by providing torque responsive circumferentially oscillatorily yieldable means for yieldingly cushioning torque, and torque responsive drive discontinuance means between the drive shaft and the tractional members, for drivingly disconnecting the variable speed means and successive rotary parts from the drive shaft at a predetermined and adjustable limit of torque.

This I accomplish by interposing between the drive shaft B and the rotary disc I a driver means or bushing A', disconnectably drivingly engaged by one or more oscillatory keys B' to the drive shaft B, on which bushing the rotary race I is oscillatorily mounted, and to which it is circumferentially yieldably connected by a torsionally responsive connection C', adjustable to drivingly connect the bushing and the drive race during normal torque, and yieldable with excessive torque to permit the drive race to oscillate circumferentially of the bushing, to cushion torsional shocks, and at a predetermined degree of such oscillation to permit the drive race to automatically disengage the drive connection between the bushing and the drive shaft B to permit the latter to revolve independently of the bushing and drive race, to discontinue drive and relieve the motor or primary source of power from such excessive load. Preferably this drive discontinuance is positive and permits the torsionally responsive connection to restore the bushing and drive race to their normal relation without restoring drive connection between them and the drive shaft, so that such connection cannot be effected until it is manually effected, which may be done if the cause of overload has been discovered and corrected.

This may be accomplished in any desirable manner, but preferably I provide one or more semicircular keyways $a'$ in the drive shaft B, and one or more reciprocal semi-cylindrical key seats $b'$ in the hub A', and mount oscillatory keys B' in these keyseats, which keys preferably have semi-cylindrical outer peripheries $d'$ oscillatory into drive engagement with the keyways in one position and having cutaway or hollow inner sides $e'$ concave to coincide with or exceed the concavity of the inner periphery of the sleeve A', and oscillatory into coincidence with such periphery for drive disconnection of the hub and the drive shaft, which keys are automatically oscillated by the oscillatory movement of the drive race member around the bushing by having projections f' extended inwardly of their axis and into the path of one or more operators or pins g' connected to and oscillated with the drive race I, these projections and pins being disposed to engage with torsional oscillation of the drive race and to oscillate the keys out of drive engagement with the keyways upon excessive oscillation of such race, whereupon the keys being neutral or passive remain in their unlocked position and permit free rotation of the drive shaft relatively to the bushing and drive race.

Preferably the key operators f' are inwardly of their axis, and the operator pins g' are inwardly of such axis, so that the oscillatory motion of the operators is converted into reverse oscillatory motion for the semi-cylindrical transmission portion of the keys, thus unlocking them by the lag of the revolving race member relatively to the similarly revolving drive shaft, the keyways in which then pass out of coincidence with the keyseats in the hub, so that the periphery of the drive shaft then aids in holding the keys in their unlocked position.

Preferably the drive race member I has a central wall extension h' across and spaced from the end of the drive shaft B, to afford clearance for the pins f' in the end of the keys B', and for the pins g' carried by the driver, and is provided with a central bearing projection i' for engaging the axial thrust bearing Z between the drive race and the drive shaft, so that when the keys are unlocked the drive shaft may anti-frictionally revoluble axially restrain the position of the drive race.

Preferably the yieldable connection C' comprises one or more radial arms j' separably screwed into the bushing A' and pressed by a torsional spring k' adjustable by a nut l' on a screw m' against a lug n' carried by the drive race I, which spring is yieldable with torsion to permit the drive race to oscillate relatively to the bushing A' for driving in one direction, and is reversible by disposing it and the arm j' at the reverse side of the lug n' for torsional yield when drive is in the reverse direction.

For manually engaging or disengaging drive connection between the bushing and the drive shaft my invention provides the keys B' with peripheral teeth o' engaged by internal teeth p' in a rotary and oscillatory ring D' encircling the drive shaft B and the keys, and having a notch q' for clearing the latter when the ring is oscillated to oscillate the keys from neutral into position for locking in either direction, which ring is oscillated by a cutout E' comprising a pinion r' having teeth meshing with teeth s' on the ring D', and mounted on an oscillating shaft t' swung from the head d and operated by a handle u' by which the pinion may be tilted into engagement with the ring and turn to oscillate it.

To provide for any reverse motor drive the pins g in the race I, and pins f' in the keys B', are removable and shiftable from a forward drive to a reverse drive position, and adjustable to adjust their relations to the drive, by screwing the pins f' adjustably into one or another of two threaded holes v', to dispose the pins in the path of oscillation of the pins g' so that oscillation of these under excessive torque will unlock.

Any suitable means for oscillating the rollers L may be used, but according to one feature of my invention I mount on their revolving swinging carriers O a spherical roller w' rotatable on a radial axis afforded by a screw c' screwed into the reduced screw threaded end x' of the axle N, which roller is embraced by a female groove y' in the axially adjustable ratio variation means or holder F' in the form of an internally hollow non-rotary ring embracing the spherical rollers w' of the several roll carriers O, for holding all the rolls in corresponding positions, and axially adjustable from a mid-position in which the roll axles are perpendicular to the axis of the races, to a right hand position for reducing speed of revolution of the spider M, and to a left hand position for increasing such speed of revolution, or to any intermediate position for varying such speed of revolution.

The roll holder F' may be axially adjusted in any desired manner, but according to one feature of my invention I provide a manual adjuster G' for adjusting it from without the outer casing, which is rotatable and shiftable from one position for mean ratio, to another for major adjustments of the holder F', and axially adjustable for minor or intermediate adjustments thereof, and consists of a reversely threaded turn-buckle adjustably screwed on to a right hand threaded slidable guide rod Z' separably attached to and sustaining the holder F', and a left hand screw threaded retainer rod z', so arranged that when these rods are screwed apart by rotating the turn-buckle, the holder F' will be shifted toward its low speed position, and when they are screwed together it will be shifted toward its high speed position, in the construction shown.

The adjuster G' preferably projects through an aperture H' in the casing a, for manual manipulation from without, and the guide rod Z' slides through a slideway I' in and is guided by the non-rotary race member J, and the rod z' is axially positioned by a pin J' which is shiftable from a central position to a medium low speed or a medium high speed position, and fixable in either position so that its position may determine medium position of the holder F', further adjustments of which from either position may be made by the adjuster G'.

For reverse drive of the reducing gearing low speed is desirable, for direct drive high speed is desirable, and for non-drive of the reducing gearing it is desirable that the planetary rolls should be in their mid-position, and my invention preferably provides for shifting the planetary rolls coincidently with and from the gear change shifter, and for retaining them in the most advantageous relation to the position of the latter, which may be done in any desired manner, but for which my invention provides a coincident connection between and common to the gear shifter lever H and the holder F', which comprises a spherical stud K' on the inner end of the shifter lever H, which stud engages a socket L' in one end of a motion reversal and multiplication lever M' fulcrumed to the race member J, the other end of which lever has a slot N' entered by the pin J', by which slot this pin is held in position axially, and is shifted from a mid-position when the lever H is in its neutral or transmission termination position to a low speed position when the lever H is in reverse or rotation reversal position, and to a high speed position when the lever H is in direct drive position, in the construction shown, in which the gear shifter is shown in reverse drive position.

Thus the variable speed elements are responsive to the gear shift to assume their normal relation when idling and their high speed relation for forward drive and low speed relation for reverse drive, and are also variable to vary speed when in any position, and their tractional engagement is variable with variations in torque, which variations are yieldably cushioned between the tractional members and the drive shaft within excessive limits, beyond which the tractional members as well as the reducing gearing are definitely revolubly disconnected from the drive shaft, thus relieving the entire transmission from operation after development of excessive torque, and relieving the motor or primary drive from all transmission load until the passive uncoupable connection between them is manually restored, so that the cause of overload may be ascertained and corrected before resuming power drive.

In operation, the character and number of reducing gearing being suited to the normal ratio of reduction desired between a drive and driven shaft when the planetary rollers are in their mid or normal position for transmitting to their spider 50% reduction of the speed of the drive shaft, the torsionally yieldable connection between the rotary race member and its hub, and its key operating pins and the oscillatory keys will be adjusted in position for normal speed and direction of drive of the usual motor or primary source of power, and any unexpected variation in such speed will be corrected by manual oscillation of the planetary rolls, either for compensating for the undue speed of the motor, or for modifying speed of the driven shaft, which during forward drive will be revolved at relatively high speed, and during backward drive will be revolved at relatively low speed, manual variation of either which may be made, and during nondrive will be passive without the necessity of arresting revolution of the tractional parts, so that revolution of these need not be terminated except for its automatic termination responsively to excessive torque for protecting the tractional and other parts from impairment by such torque.

In case direction of drive of the motor or primary source of power is the reverse to that expected the torsionally responsive springs will be reversed, the keys will be shifted to their positions for reverse drive, and their pins and the oscillating pins on the rotary race will be shifted to correspondingly provided holes for effecting reverse oscillation of these to unlock them when the rotary race is oscillated in the reverse direction by reversal of direction of primary drive.

The normal tractional pressure incident to the springs Q, and any additional pressure incident to the torsionally responsive connection U between the reducing gearing and the spider M will be transmitted to the rotary race and sustained by its bearing Z against the drive shaft B and its axial thrust bearings i.

The manual uncoupler ring will ride passively on the oscillatory keys, its inner teeth assuring their corresponding positions and oscillation, and its outer teeth clearing the pinion of the hand lever during normal operation, but engaged thereby for operating the ring to unlock the keys or for oscillating the ring to unlock the keys or to relock the keys, as circumstances require.

The spider and its shaft S will be axially slidable through the reducing reversing and shifting gearing to the slight extent necessary to permit the rollers L to respond to normal and torsional stresses of the spring Q and wedge pins U, so that normal mild axial stress as well as that due to conversion of torsional into axial stress may be consumed between the thrust bearing o of the reduction gearing and the thrust bearing Z of the rotary race, between which the spider M and its shaft S are freely axially floatable to conform to the positions and conditions of the planetary rolls and facilitate their adjustment.

Proportions, arrangement, relation, and number, of any of the parts, and materials used therefor, may be any desired, or best suited to the requirements of use, peripherally yieldable, frictionally faced, rollers being shown.

It will be seen that my invention provides improvements which can be readily and advantageously availed of in whole or in part, and it will be understood that the invention is not limited to the particular details of construction, arrangement, relation, combination, or use, of the parts set forth and shown as constituting the preferred form of my invention, since these may be availed of in whole or in part as circumstances or the judgment of those skilled in the art may dictate without departing from the spirit of the invention.

Although for the purpose of illustrating the preferred utilization of my present invention I have shown as the drivingly connectable and disconnectable connection between the drive member I and the drive shaft B my torque operative clutch comprising a circumferentially oscillatory semi-cylindrical key B' oscillatory about an axis in the hub A' and having an oscillation provision f' oscillatory across the periphery of the drive shaft B and oscillated from inwardly of said periphery by a torque responsive operator g'; and manually operable by a manual operator D' rotatable with it and movable relatively to it, this torque responsive clutch is not claimed as a clutch in this application, but is claimed as a clutch in my companion application Serial No. 610,807 filed May 12, 1932.

What I claim is:

1. In rotation transmissions comprising, rotary drive means, for the rotatable transmission of torque and rotary motion, rotary driven means, rotatable from and relatively to said drive means during said transmission, for the rotatable transmission of torque and rotary motion therefrom, speed change means in operative relation to said rotary means, rotatable from said drive means and being operable to transmit torque and rotation at changed speed therefrom to said driven means during said transmission, and drive connection means in operative relation to said rotary means and to said speed change means, for effecting said transmission; the combination therewith of torque responsive torque termination means in operative relation to one of said rotary means and to said speed change means, for transmitting and for terminating said transmission of torque therethrough, designed to transmit a normal torque load, being operable during said normal torque load to transmit torque through said rotary means and said speed change means, and being operable upon overload to terminate said transmission of said torque therethrough, and being operable to terminate said changed speed rotation transmission upon said overload.

2. In rotation transmissions comprising, rotary drive means, for the rotatable transmission of torque and rotary motion, rotary driven means, rotatable from and relatively to said drive means during said transmission, for the rotatable transmission of torque and rotary motion therefrom, rotation reversal means in operative relation to said rotary means, rotatable from said drive means and being operable to reversely rotate said driven means therefrom, during said transmission, for reversely transmitting said torque and rotation from said drive means to said driven means, and drive connection means in operative relation to said rotary means and said rotation reversal means, for effecting said transmission; the combination therewith of torque responsive torque termination means in operative relation to one of said rotary means and to said rotation reversal means, for transmitting and for terminating said transmission of torque therethrough, designed to transmit a normal torque load, being operable during said normal torque load to transmit torque through said rotary means and said rotation reversal means, and being operable upon overload to terminate said transmission of said torque therethrough, and being operable to terminate said reversal rotation transmission upon said overload.

3. In rotation transmissions comprising, rotary drive means, for the rotatable transmission of torque and rotary motion, rotary driven means, rotatable from and relatively to said drive means during said transmission, for the rotatable transmission of torque and rotary motion therefrom, variable speed means in operative relation to said rotary means, rotatable from said drive means and being operable to rotate said driven means therefrom at variable speed, during said transmission, for transmitting said torque and rotation at variable speed from said drive means to said driven means, and drive connection means in operative relation to said rotary means and to said variable speed means, for effecting said transmission; the combination therewith of torque responsive torque termination means in operative relation to one of said rotary means and to said variable speed means, for transmitting and for terminating said transmission of torque therethrough, designed to transmit a normal torque load, being operable during said normal torque load to transmit torque through said rotary means and said variable speed means, and being operable upon overload to terminate said transmission of said torque therethrough, and being operable to terminate said variable rotation transmission upon said overload.

4. In rotation transmissions comprising, rotary drive means, for the rotatable transmission of torque and rotary motion, rotary driven means, rotatable from and relatively to said drive means during said transmission, for the rotatable transmission of torque and rotary motion therefrom, speed reducer means in operative relation to said rotary means, rotatable from said drive means and being operable to rotate said driven means at reduced speed therefrom, during said transmission, for transmitting said torque and rotation at reduced speed from said drive means to said driven means, and drive connection means in operative relation to said rotary means and said speed reducer means, for effecting said transmission; the combination therewith of torque responsive torque termination means, in operative relation to one of said rotary means and said speed reducer means, for transmitting and for terminating said transmission of torque therethrough, designed to transmit a normal torque load, being operable during said normal torque load to transmit torque through said rotary means and said speed reducer means, and being operable upon overload to terminate said transmission of said torque therethrough, and being operable to terminate said transmission of rotation at reduced speed upon said overload.

5. In rotation transmissions comprising, rotary drive means, for the rotatable transmission of rotary motion, rotary driven means, rotatable from and relatively to said drive means during said transmission, for the rotatable transmission of rotary motion therefrom, speed change means in operative relation to said rotary means, rotatable from said drive means and being operable to rotate said driven means at changed speed therefrom during said transmission, for transmitting said rotation at changed speed from said drive means to said driven means, and drive connection means in operative relation to said rotary means and to said speed change means, for effecting said transmission; the combination therewith of torque responsive rotation termination means in operative relation to one of said rotary means, and to said speed change means, for transmitting and for terminating said transmission of rotation therethrough, designed to transmit a normal torque load, being operable during said normal torque load to transmit rotation through said rotary means and said speed change means, and being operable upon overload to terminate said transmission of rotation therethrough, and being operable to terminate said changed speed rotation transmission upon said overload.

6. In rotation transmissions comprising, rotary drive means, for the rotatable transmission of rotary motion, rotary driven means, rotatable from and relatively to said drive means during said transmission, for the rotatable transmission of rotary motion therefrom, rotation reversal means in operative relation to said rotary means, rotatable from said drive means and being operable to reversely rotate said driven means therefrom, during said transmission, for transmitting said rotation in reverse direction from said drive means to said driven means, and drive connection means in operative relation to said rotary means and to said rotation reversal means, for effecting said transmission; the combination therewith of torque responsive rotation termination means in operative relation to one of said rotary means and to said rotation reversal means, for transmitting and for terminating said transmission of rotation therethrough, designed to transmit a normal torque load, being operable during said normal torque load to transmit rotation through said rotary means and said rotation reversal means, and being operable upon overload to terminate said transmission of rotation therethrough, and being operable to terminate said reversal rotation transmission upon said overload.

7. In rotation transmissions comprising, rotary drive means, for the rotatable transmission of rotary motion, rotary driven means, rotatable from and relatively to said drive means during said transmission, for the rotatable transmission of rotary motion therefrom, variable speed means in operative relation to said rotary means, rotatable from said drive means and being operable to rotate said driven means at variable speed therefrom, during said transmission, for transmitting said rotation at variable speed from said drive means to said driven means, and drive connection means in operative relation to said rotary means and to said variable speed means, for effecting said transmission; the combination therewith of torque responsive rotation termination means in operative relation to one of said rotary means and to said variable speed means, for transmitting and for terminating said transmission of rotation therethrough, designed to transmit a normal torque load, being operable during said normal torque load to transmit rotation through said rotary means and said variable speed means, and being operable upon overload to terminate said transmission of said rotation therethrough, and being operable to terminate said variable speed rotation transmission upon said overload.

8. In rotation transmissions comprising, rotary drive means, for the rotatable transmission of rotary motion, rotary driven means, rotatable from and relatively to said drive means during said transmission, for the rotatable transmission of rotary motion therefrom, rotation reduction means in operative relation to said rotary means, rotatable from said drive means and being operable to rotate said driven means at reduced speed therefrom, during said transmission, for transmitting said rotation at reduced speed from said drive means to said driven means, and drive connection means in operative relation to said rotary means and to said rotation reduction means, for effecting said transmission; the combination therewith of torque responsive rotation termination means in operative relation to one of said rotary means and to said rotation reduction means, for transmitting and for terminating said transmission of rotation therethrough, designed to transmit a normal torque load, being operable during said normal torque load to transmit rotation through said rotary means and said rotation reduction means, and being operable upon overload to terminate said transmission of rotation therethrough, and being operable to terminate said rotation reduction transmission upon said overload.

9. In rotation transmissions comprising, rotary drive means, for the rotatable transmission of rotary motion, rotary driven means, rotatable from and relatively to said drive means during said transmission, for the rotatable transmission of rotary motion therefrom, speed change means in operative relation to said rotary means, rotatable from said drive means and being operable to rotate said driven means at changed speed therefrom, during said transmission, for transmitting said rotation at changed speed from said drive means to said driven means, drive connection means in operative relation to one of said rotary means and to said speed change means, for effecting said transmission, and yieldable drive connection means in operative relation to one of said rotary means and to said speed change means, designed to transmit a variable torque load, and yieldable with variations of said torque load, for yieldably transmitting rotation between one of said rotary means and said speed change means during said variation; the combination therewith of rotation continuation and termination means in operative relation to one of said rotary means and to said yieldable connection means, for transmitting and for terminating transmission of rotation therethrough, operated with said yield of said yieldable connection means, being operable to continue said transmission during said yield of the latter during minor variations of said torque load, and being operable to terminate said transmission with said yield of said yieldable connection means during a major variation of said torque load, and being operable to terminate said transmission of changed speed rotation upon said major variation of said torque load.

10. In rotation transmissions comprising, rotary drive means, for the rotatable transmission of rotary motion, rotary driven means, rotatable from and relatively to said drive means during said transmission, for the rotatable transmission of rotary motion therefrom, rotation reversal means in operative relation to said rotary means, rotatable from said drive means and being operable to reversely rotate said driven means therefrom, during said transmission, for reversely transmitting said rotation from said drive means to said driven means, drive connection means in operative relation to one of said rotary means and to said rotation reversal means, for effecting said transmission, and yieldable drive connection means in operative relation to one of said rotary means and to said rotation reversal means, designed to transmit a variable torque load, and yieldable with variations in said torque load, for yieldably transmitting rotation between one of said rotary means and said rotation reversal means during said variations; the combination therewith of rotation continuation and termination means in operative relation to one of said rotary means and to said yieldable connection means, for transmitting and for terminating transmission of rotation therethrough, operated with said yield of said yieldable connection means, being operable to continue said transmission during said yield of the latter during minor variations of said torque load, and being operable to terminate said transmission with said yield of said yieldable connection means during a major variation of said torque load, and being operable to terminate said rotation reversal transmission of rotation upon said major variation of said torque load.

11. In rotation transmissions comprising, rotary drive means, for the rotatable transmission of rotary motion, rotary driven means, rotatable from and relatively to said drive means during said transmission, for the rotatable transmission of rotary motion therefrom, variable speed means in operative relation to said rotary means, rotatable from said drive means and being operable to rotate said driven means at variable speed therefrom, during said transmission, for transmitting said rotation at variable speed from said drive means to said driven means, drive connection means in operative relation to one of said rotary means and to said variable speed means, for effecting said transmission, and yieldable drive connection means in operative relation to one of said rotary means and to said variable speed means, designed to transmit a normal torque load, and yieldable with variations of said torque load, for yieldably transmitting rotation between one of said rotary means and said variable speed means during said variations; the combination therewith of rotation continuation and termination means in operative relation to one of said rotary means and to said yieldable connection means, for transmitting and for terminating transmission of rotation therethrough, operated with said yield of said yieldable connection means, being operable to continue said transmission during said yield of the latter during minor variations of said torque load, and being operable to terminate said transmission with said yield of said yieldable connection means during a major variation of said torque load, and being operable to terminate said variable speed rotation transmission upon said major variation of said major torque load.

12. In rotation transmissions comprising, rotary drive means, for the rotatable transmission of rotary motion, rotary driven means, rotatable from and relatively to said drive means during said transmission, for the rotatable transmission of rotary motion therefrom, rotation reduction means in operative relation to said rotary means, rotatable from said drive means and being operable to rotate said driven means at reduced speed therefrom, during said transmission, for transmitting said rotation at reduced speed from said drive means to said driven means, drive connection means in operative relation to one of said rotary means and to said rotation reduction means, for effecting said transmission, and yieldable drive connection means in operative relation to one of said rotary means and to said rotation reduction means, designed to transmit a variable torque load, and yieldable with variations of said torque load, for yieldably transmitting rotation between one of said rotary means and said rotation reduction means during said variations; the combination therewith of rotation continuation and termination means in operative relation to one of said rotary means and to said yieldable connection means, for transmitting and for terminating transmission of rotation therethrough, operated with said yield of said yieldable connection means, being operable to continue said transmission during said yield of the latter during minor variations of said torque load, and being operable to terminate said transmission with said yield of said yieldable connection means during a major variation of said torque load, and being operable to terminate said transmission of rotation at reduced speed upon said major variation of said torque load.

13. In rotation transmissions comprising, rotary drive means, for the rotatable transmission of torque and rotary motion, rotary driven means, rotatable from and relatively to said drive means during said transmission, for the rotatable transmission of torque and rotary motion therefrom, speed change means in operative relation to said rotary means, rotatable from said drive means and being operable to rotate said driven means at changed speed therefrom, during said transmission, for transmitting torque and said rotation at changed speed from said drive means to said driven means, and drive connection means in operative relation to said rotary means and to said speed change means, for effecting said transmission; the combination therewith of torque operated rotation termination means in operative relation to said speed change means and to one of said rotary means, for transmitting rotation therethrough and for terminating said transmission, being operable to transmit said rotation therethrough during a normal torque load therethrough, and being operated upon torque overload thereof to terminate said transmission of rotation therethrough, for terminating said transmission of rotation upon said overload, and being operable to terminate said transmission of rotation at changed speed upon said overload.

14. In rotation transmissions comprising, rotary drive means, for the rotatable transmission of torque and rotary motion, rotary driven means, rotatable from and relatively to said drive means during said transmission, for the rotatable transmission of torque and rotary motion therefrom, speed change means in operative relation to said rotary means, rotatable from said drive means and being operable to rotate said driven means at changed speed therefrom, during said transmission, for transmitting torque and said rotation at changed speed from said drive means to said driven means, and drive connection means in operative relation to said rotary means and to said speed change means, for effecting said transmission; the combination therewith of torque restrained rotation termination means in operative relation to one of said rotary means and to said speed change means, for transmitting rotation therethrough and for terminating said transmission, operable to transmit said rotation therethrough during a normal torque load therethrough, restrained from termination of said transmission therethrough throughout said normal torque load, and being operable upon overload of said speed change means to terminate said transmission of rotation through the latter, for terminating said transmission upon said overload, and being operable to terminate said transmission of rotation at changed speed upon overload of said speed change means.

15. In rotation transmissions comprising, rotary drive means, for the rotatable transmission of torque and rotary motion, rotary driven means, rotatable from and relatively to said drive means during said transmission, for the rotatable transmission of torque and rotary motion therefrom, speed means in operative relation to said rotary means, rotatable from the drive means and being operable to rotate said driven means at changed speed therefrom, during said transmission, for transmitting torque and said rotation at changed speed from said drive means to said driven means, and drive connection means in operative relation to said rotary means and to said speed change means, for effecting said transmission; the combination therewith of torque released rotation termination means in operative relation to one of said rotary means and to said speed change means, for transmitting said rotation and for terminating said transmission, in rotation transmission operative relation thereto and being operable to transmit said rotation therethrough during transmission of a normal torque load therethrough, and being torsionally released from transmission relation thereto upon torque overload thereof, and being operable upon said overload to terminate said transmission of rotation therethrough, for terminating said transmission upon said overload, and being operable to terminate said transmission of rotation at changed speed upon overload of said changed speed means.

16. In rotation transmissions comprising, rotary drive means, for the rotatable transmission of torque and rotary motion, rotary driven means, rotatable from and relatively to said drive means during said transmission, for the rotatable transmission of torque and rotary motion therefrom, speed change means in operative relation to said rotary means, rotatable from said drive means and being operable to rotate said driven means at changed speed therefrom, during said transmission, for transmitting said torque and said rotation at changed speed from said drive means to said driven means, and drive connection means in operative relation to said rotary means and to said speed change means, for effecting said transmission; the combination therewith of torque moved transmission continuation and termination means in operative relation to one of said rotary means and to said speed change means, for transmitting rotation therebetween and for terminating said transmission, in movable operative relation thereto, being operable to transmit rotation therethrough throughout a normal torque load therethrough, for effecting said transmission throughout said normal torque load, and being movably operable to terminate said transmission therethrough upon overload of said speed change means, for terminating said transmission upon said overload, and being operable to continue said transmission of rotation therethrough at changed speed prior to overload of and to terminate said transmission of rotation at changed speed upon overload of said changed speed means.

17. In rotation transmissions comprising, rotary drive means, for the rotatable transmission of rotation, rotary driven means, rotatable from and relatively to said drive means during said transmission, for the rotatable transmission of rotary motion therefrom, speed change means in operative relation to said rotary means, rotatable from said drive means and being operable to rotate said driven means at changed speed therefrom, during said transmission, for transmitting said rotation at changed speed from said drive means to said driven means, drive connection means in operative relation to said rotary means and to said speed change means, for effecting said transmission, driver means in operative relation to one of said rotary means and to said speed change means, revoluble therewith and movable relatively to one thereof during said transmission, for movably transmitting said rotation therebetween, and yieldable drive connection means in operative relation to said speed change means and to said driver means, for transmitting rotation therebetween, designed to transmit a normal torque load, being operable during said normal torque load to transmit rotation therethrough, and being yieldably movable upon overload, for yieldably permitting said relative movement therebetween upon overload; the combination therewith of rotation termination means in operative relation to one of said rotary means and to said driver means, for transmitting said rotation therebetween and for terminating said transmission, in operative relation to said yieldable connection means, operated with said yieldable movement of the latter upon said overload thereof, and being operable to continue said transmission during said normal torque load and to terminate said transmission with said yieldable movement of said yieldable connection means upon said overload, and being operable to terminate said transmission of changed speed rotation upon overload of said yieldable connection.

18. In rotation transmissions comprising, rotary drive means, for the rotatable transmission of rotary motion, rotary driven means, rotatable from and relatively to said drive means during said transmission, for the rotatable transmission of rotary motion therefrom, speed reducer means in operative relation to said rotary means, rotatable from said drive means, and being operable to rotate said driven means at reduced speed therefrom, during said transmission, speed variation means in operative relation to one of said rotary means and to said speed reducer means, rotatable from said drive means and being operable to rotate said speed reducer means at variable speed therefrom, during said transmission, for transmitting said rotation at variable speed from said drive means to said speed reducer means, and drive connection means between said reducer means and one of said rotary means and between said variation means and the other of said rotary means, respectively, for effecting said transmission; the combination therewith of rotation continuation and termination means common to and in operative relation to said speed reducer means and to said speed variation means, for continuing transmission of said rotation from the latter to the former and for terminating said transmission, drivingly engageable with said speed reducer means and with said speed variation means, being operable when drivingly engaged therewith to effect said transmission from the latter to the former, and drivingly disengageable with one thereof during rotation of said variation means, and being operable when drivingly disengaged from one thereof to terminate said transmission from said speed variation means to said speed reducer means during rotation of said speed variation means, and being operable to terminate said transmission therethrough without stopping rotation of both thereof.

19. In rotation transmissions comprising, rotary drive means, for the rotatable transmission of rotary motion, rotary driven means, rotatable from and relatively to said drive means during said transmission, for the rotatable transmission of rotary motion therefrom, speed change means in operative relation to said rotary means, rotatable from said drive means and being operable to rotate said driven means at changed speed therefrom, during said transmission, for rotating said driven means at changed speed from said drive means, variable speed means in operative relation to said rotary means, rotatable from said drive means and being operable to rotate said speed change means at variable speed therefrom, during said transmission, for rotating said speed change means at variable speed from said drive means, direction reversal means in operative relation to said speed change means and to said variable speed means, rotatable from the latter and being operable when in one position to rotate the former therefrom in the direction of rotation thereof, and when in another position to rotate said speed change means from and reversely to the direction of rotation of said variable speed means, during said transmission, for defining the direction of transmission of said rotation, operator means in operative relation to said rotation direction means, for operating the latter, ratio variation means, in operative relation to said speed variation means, for varying the ratio of the latter, and drive connection means in operative relation to said speed change means and to one of said rotary means and in operative relation to said speed variation means and the other of said rotary means, respectively, for effecting said transmission; the combination therewith of coincident connection means common to and in operative relation to said direction reversal means and to said ratio variation means, operated coincidently with operation of the former, being operable coincidently with said operation of the former to coincidently operate said ratio variation means, and being operable to vary said ratio variation means coincidently with said variation of said direction reversal means, and being operable to vary said ratio of said transmission coincidently with variation of the direction of said transmission.

20. In rotation transmissions comprising, rotary drive means, for the rotatable transmission of rotary motion, rotary driven means, rotatable from and relatively to said drive means during said transmission, for the rotatable transmission of rotary motion therefrom, revoluble and rotatable speed change means in operative relation to said rotary means, rotatable from said drive means and being operable to rotate said driven means at changed speed therefrom, during said transmission, comprising concentric spaced members, one revoluble about the axis of and revolved from said drive means, a revoluble and rotary member between said members, and having a revoluble axis revoluble around said axis and between said members, revolved on one of said members by the other of said members, for defining the speed of revolution of said revoluble axis, and drive connection means between one of said rotary means and said speed change means and between the other of said rotary means and said revoluble axis of said revoluble and rotary member, respectively, for effecting said transmission; the combination therewith of torque responsive torque termination means in operative relation to one of said rotary means and to said revoluble and rotary speed change means, for transmitting torque therethrough and for terminating said transmission, designed to transmit a normal torque load, being operable to transmit torque therethrough during said normal torque load, and being operable upon overload of said torque responsive torque termination means to terminate said transmission of torque, and being operable to terminate said revoluble and rotatable transmission of rotation at variable speed upon said overload.

GEORGE HOLT FRASER.